(12) United States Patent
Frei et al.

(10) Patent No.: US 6,842,780 B1
(45) Date of Patent: Jan. 11, 2005

(54) METHOD OF MANAGEMENT IN A CIRCUIT-SWITCHED COMMUNICATION NETWORK AND DEVICE WHICH CAN BE USED AS A NODE IN A CIRCUIT-SWITCHED COMMUNICATION NETWORK

(75) Inventors: Christian R. Frei, Monthey (CH); Beat Liver, Thun (CH); Dean T. Allemang, Belmont, MA (US); Boi Faltings, Lausanne (CH)

(73) Assignee: Swisscom AG, Bern (CH)

( * ) Notice: Subject to any disclaimer, the term of this patent is extended or adjusted under 35 U.S.C. 154(b) by 0 days.

(21) Appl. No.: 09/402,633

(22) PCT Filed: Apr. 9, 1997

(86) PCT No.: PCT/EP97/01761
§ 371 (c)(1),
(2), (4) Date: May 25, 2000

(87) PCT Pub. No.: WO98/46040
PCT Pub. Date: Oct. 15, 1998

Related U.S. Application Data

(60) Provisional application No. 60/042,711, filed on Apr. 8, 1997.

(51) Int. Cl.$^7$ ................................................. G06F 11/30
(52) U.S. Cl. ........................ 709/221; 709/224; 709/232; 370/389
(58) Field of Search .............................. 709/206, 222, 709/224, 228, 232, 220, 227, 250, 253; 370/288, 217, 220

(56) References Cited

U.S. PATENT DOCUMENTS

| | | | |
|---|---|---|---|
| 5,430,729 A | 7/1995 | Rahnema | ............ 370/103 |
| 5,519,836 A | 5/1996 | Gawlick et al. | ............ 709/206 |
| 5,535,195 A * | 7/1996 | Lee | ............ 370/256 |
| 5,576,873 A * | 11/1996 | Crossland et al. | ............ 398/54 |
| 5,835,710 A * | 11/1998 | Nagami et al. | ............ 709/250 |
| 5,870,545 A * | 2/1999 | Davis et al. | ............ 709/201 |
| 5,872,918 A * | 2/1999 | Malomsoky et al. | ............ 709/220 |
| 5,901,136 A * | 5/1999 | Lovelace et al. | ............ 370/217 |
| 6,198,720 B1 * | 3/2001 | Deschaine et al. | ............ 370/220 |
| 6,263,374 B1 * | 7/2001 | Olnowich et al. | ............ 709/253 |
| 6,285,687 B1 * | 9/2001 | Lovelace et al. | ............ 370/509 |

OTHER PUBLICATIONS

Davis L et al: "A Genetic Algorithm for Survivable Network Design", Proceedings of the International Conference of Genetic Algorithms, University of Illinois, Urbana–Champaign, Jul. 17–21, 1993, pp. 408–415, XP000449245 Forrest S paragraphs "Formalism"; "Chromosome Evaluation".

(List continued on next page.)

*Primary Examiner*—Zarni Maung
*Assistant Examiner*—Khanh Quang Dinh
(74) *Attorney, Agent, or Firm*—Oblon, Spivak, McClelland, Maier & Neustadt, P.C.

(57) ABSTRACT

Method of management in a circuit-switched communication network (1), performed on or with the aid of at least a programmable apparatus (10) connected to said network. It comprises the step of computing and storing in an electronic memory a representation of the network based on B-blocking islands (Ni). Each B-blocking island consists of a set of nodes (A–g) linked in such a way that at least one route with at least an amount B of available concave resources exists between any pair of nodes in the set at the time t. The B-blocking islands (Ni) are organized in a hierarchy, wherein the hierarchical position of each $B_i$-blocking island depends on the choice of the values $B_i$ used for defining said blocking island. The available bandwidth resources are thus summarized in order to reduce the complexity of network management tasks. Bottlenecks in the network are highlighted. The B-blocking-island hierarchy can be incrementally maintained.

58 Claims, 7 Drawing Sheets

OTHER PUBLICATIONS

Dimitrijevic D D et al: "Routing in Multidomain Networks", IEEE/ACM Transactions on Networking, vol. 2, No. 3, Jun. 1, 1994, pp. 252–262, XP000464500.

Kwang–Hui Lee: "A Distributed Network Management System", Proceedings of the Global Telecommunications Conference (GLOBECOM), San Francisco, Nov. 28–Dec. 2, 1994, vol. 1, pp. 548–552, XP000488606 IEEE, paragraphs II, V, III.

Cengiz Alaettinoglu et al: "The Viewserver Hierachy for Interdomain Routing: Protocols and Evaluation" IEEE Journal on Selected Areas in Communications, vol. 13, No. 8, Oct. 1, 1995, pp. 1396–1410, XP000536613 see paragraph 1.

Anthony Alles, "ATM Internetworking," May 1995, pp. 1–58.

Fergal Somers, "HYBRID: Intelligent Agents for Distributed ATM Network Management," 9 pages.

Zheng Wang and Jon Crowcroft, "Quality–of–Service Routing for Supporting Multimedia Applications," IEEE Journal on Selected Areas in Communications, vol. 14, No. 7, Sep. 1996, pp. 1228–1234.

* cited by examiner

METHOD OF MANAGEMENT IN A CIRCUIT-SWITCHED COMMUNICATION NETWORK AND DEVICE WHICH CAN BE USED AS A NODE IN A CIRCUIT-SWITCHED COMMUNICATION NETWORK

This application is the national phase of International application PCT/EP97/01761 filed Apr. 9, 1997 which designated the U.S.

This application also claims the benefit of U.S. Provisional Application No. 60/042,711, filed Apr. 8, 1997

BACKGROUND OF THE INVENTION

1. Field of the Invention

The present invention relates to a management method and device in a circuit-switched communication network using an improved summarised representation of the network. Furthermore, the present invention relates to a routing method and device, to a pricing method and device and to a planning method and device in a circuit-switched communication network.

2. Description of the Related Art

Communication networks comprise a set of nodes interconnected with links to permit the exchange of information which may be voice, sound, graphics, pictures, video, text or data. The nodes-are divided into two types: terminal nodes and communication nodes. The terminal nodes, such as phone sets, computers, printers, file servers or video monitors, generate or use the information transmitted over the network. The communication nodes, such as switches or gateways relay the information but do not generate or use it. The communication from some terminal node A to terminal node B takes place over one or more communication links. The physical medium that supports this communication may be a cable, copper wires, an optical fiber or a radio link, for instance.

A need to exchange information between two nodes is called a demand. Demands can either be uni- or bi-directional, or do not require that the same amount of bandwidth be transmitted in both ways. However, links are bi-directional. Networks requiring the establishment of a connection before information can be transferred between nodes are called circuit-switched communication networks. In those networks, a circuit is established only on demand and is deallocated when no longer needed. Circuit-switched communication networks can use a variety of protocols such as, for instance, Asynchronous Transfer Mode (ATM), Time Division Multiplexing (TDM), Resource Reservation Protocol (RSVP), Transmission Control Protocol (TCP) and Synchronous Digital Hierarchy (SDH). Common circuit-switched communication networks need at least some form of management of resources and demands arising in the network. Most circuit-switched networks are centrally managed (not TCP however). A central hardware and software management platform manages and routes, usually in "real-time", all new demands through the network. The central management platform may perform other tasks such as pricing and analysis functions to study the network load, identify bottlenecks, and so on.

Each link in the network may be characterised by at least one metric such as the bandwidth available on the link. Some circuit-switched communication networks such as, for example, ATM, allows management based on quality of service (QoS) requirements. Each new demand may contain a quality of service parameter indicating the amount of resources the calling user requires for the communication he wants to establish. A typical resource that may be requested would be, for instance, the bandwidth: a caller in an ATM network can request establishment of, a connection with at least 64 Kbit/second for instance. However, in order to support a wide range of applications, new routing protocols may use quality of service parameters defined with multiple metrics such as bandwidth, delay and loss probability Zheng Wang and Jon Crowcroft describe in "Quality-of-Service Routing for Supporting Multimedia Applications", *IEEE Journal on Selected Areas in Communications*, vol. 14, n° 7, p. 1228, September 1996, a strategy to find a path satisfying several requirements. For instance, this method allows a path to be found with maximum bottleneck bandwidth (the widest path), and when there are more than one widest path, the one with the shortest propagation delay.

The central platform usually comprises an electronic memory storing some form of representation of the state of the network at the time considered. This representation usually includes information about the topology of the network, i.e., a list of nodes and links interconnecting those nodes. The representation stored in said memory usually also contains some information about circuits already established across the network and, in some cases, about demands for establishing new circuits across the network.

In a centrally managed network, the central management platform is usually responsible for routing demands, i.e., for determining a route across the network for each new demand. The efficiency of the routing means, i.e., its ability to find a <<good>> route for most new demands, depends not only on the routing algorithm used, but also on the stored representation of the state of the network. For very big networks, it becomes no longer possible to store and update in the RAM of the management platform a complete representation of the network and to work in real time on it. It may be possible to reduce the size of said representation by aggregating at least some subnetworks in single nodes. However, if said representation is incomplete, the routing means are likely not to be able to find a good route. Even if it is possible to work on a complete representation of the network, the time needed by the routing means to find a circuit through a huge amount of nodes may become no longer acceptable. In other words, there is a trade-off between the size of the network and the admissible time for finding a route for new demands.

In most communication networks, the price of a communication is computed based on the connection duration only (Internet), on connection and bandwidth (some Internet providers), or on duration, time of the day and distance (telephone network). Networks with a dynamic pricing policy have also been experimented with: in this case, the price of a connection through a link depends on the resources available on that link. In a centrally managed network, the price for a new communication may be computed by the central management platform based on its knowledge of the state of the network at time t. Dynamic price procedures therefore also require the central platform to store at least some form of representation of the network's state or topology.

Network planning tools are used for analysing the behaviour of an existing network and/or planning the construction of a new network or the modification (extension) of an existing network. They may use a network simulator for generating the expected demands, or import them from, e.g., measurement tools. They can be used as stand-alone devices or may be connected to an existing network. Network planning tools usually use a memory to store a representation of the topology of the network. The operator can then observe the behaviour of the network in order to plan improvements to the network. Working on a complete representation of very big networks need however huge memories and very expensive computers to be performed in a reasonable time. Network planning tools therefore sometimes use a summarised representation of the network with subnetworks aggregated in a single node. This summarised representation may however hide bottlenecks inside aggregated subnetworks. Moreover, it may be difficult even for an experienced operator to point out problems which may occur in a network, specially in a network containing thousands or even millions of nodes.

Routing means, price procedure determination means and network planning tools therefore all need to store and/or work on some form of dynamic representation of the state of the network. When the size of the network grows, the size of its representation grows accordingly, and it becomes difficult to work on such a big representation.

One technical problem the invention wishes to solve is to find an improved method of management of demands and resources in a centrally managed circuit-switched communication network that uses an improved representation of the state of the network. In particular, one technical problem the invention aims to solve is to find an improved routing method and an, improved pricing method. One other technical problem the invention aims to solve is to find an improved network planning method which can be distributed or performed on a central management platform in a centrally managed circuit-switched communication and/or on a stand-alone general purpose computer, wherein the improved network planning method uses an improved representation of the state of the network.

In order to manage big networks, it has been proposed that network management functions be distributed to local agents, each local agent being responsible for a limited subset of nodes in the network. A node requesting establishment of a new connection may ask its local master to find a route and determine the price of the connection. Agents co-operate to ensure routing through the whole network. The structure of agents is hierarchised: higher-level agents arbitrate disputes between peer agents which cannot be solved otherwise. A local agent may for instance try to find a path across the network based upon the requested quality of service and its knowledge of the network state; if it fails, or if the destination node does not belong to the subset it rules, the local agent may ask a higher-level agent to solve the problem. This establishment of a new connection may ask its local master to find a route and determine the price of the connection. Agents cooperate to ensure routing through the whole network. The structure of agents is hierarchised: higher-level agents arbitrate disputes between peer agents which cannot be solved otherwise. A local agent may for instance try to find a path across the network based upon the requested quality of service and its knowledge of the network state; if it fails, or if the destination node does not belong to the subset it rules, the local agent may ask a higher-level agent to solve the problem. This distributed management needs at least some signalling protocols to be established between local agents. For instance, information about link metrics and about the state of particular nodes must be shared between local agents.

Such a distributed management is described by Anthony Alles of Cisco Systems, Inc, in " ATM Internetworking", May 1995. General information about management of demands and resources in an ATM network are given by David E. McDysan and Darren L. Spohn in "ATM—Theory and Application", *McGraw-Hill Series on Computer Communications,* 1994, ISBN 0-07-060362-6. Fergal Somers of Ericsson Applied Laboratory in Network Management describes in "HYBRID: Intelligent Agents for Distributed ATM Network Management" an ATM network managed by a hierarchy of distributed agents. Each agent manages resources and demands in an arbitrarily and statically defined subnetwork, in most cases an administrative domain of some kind. For instance, a university could be managed as follows: an agent is in charge in each lab, whereas other agents each oversee a department and a single one rules the university.

It would not be possible for every local agent in a very big network with distributed management to store a complete representation of the state of the complete network. For that reason, the representation of the state of the network in each local agent and in the signalling messages transmitted between local agents is sometimes summarised by replacing aggregated sets of nodes by a single node.

One technical problem the invention wishes to solve is thus to find an improved distributed method of management of demands and resources in a circuit-switched communication network that uses an improved representation of the state of the network.

One other problem the invention wishes to solve is to find an improved hierarchy of distributed agents for managing a circuit-switched communication network.

BRIEF SUMMARY OF THE INVENTION

The present invention generally seeks to provide an improved method of management of demands and resources in a circuit-switched communication network. The present invention also seeks to provide an improved routing method, an improved pricing method and an improved network planning method in a circuit-switched communication network with central or distributed management. Furthermore, the present invention seeks to provide an improved device which can be used as a (terminal or communication) node in a circuit-switched communication network such as an ATM network. The present invention is also directed to apparatus for carrying out the disclosed methods, including apparatus parts for performing each described method step, be it by way of hardware components, a computer programmed by appropriate software, or by any combination of the two, or in any other manner.

According to various aspects of the present invention, these improvements follow from the features of the characterising part of the independent claims.

As one skilled in the art will recognise, these improvements will result in a technically improved functioning of the circuit-switched communication network, in particular a faster and better routing of new demands, an improved use of resources and a better pricing.

More specifically, these improvements follow from a new method for summarising the resources available in a network. The method consists in grouping at least some of the terminal nodes and the communication nodes of said network into a plurality of B-blocking islands, each B-blocking island consisting of a maximal set of nodes linked in a such a way that at least a route with at least an amount B of one concave resource exists between any pair of nodes in the set at the time t.

BRIEF DESCRIPTION OF THE DRAWINGS

The present invention will be explained in more detail, by way of example, with reference to the drawings in which:

FIGS. 4a-4d are four levels of a hierarchical representation of a communication network;

DETAILED DESCRIPTION OF THE DRAWINGS

Figure 1:
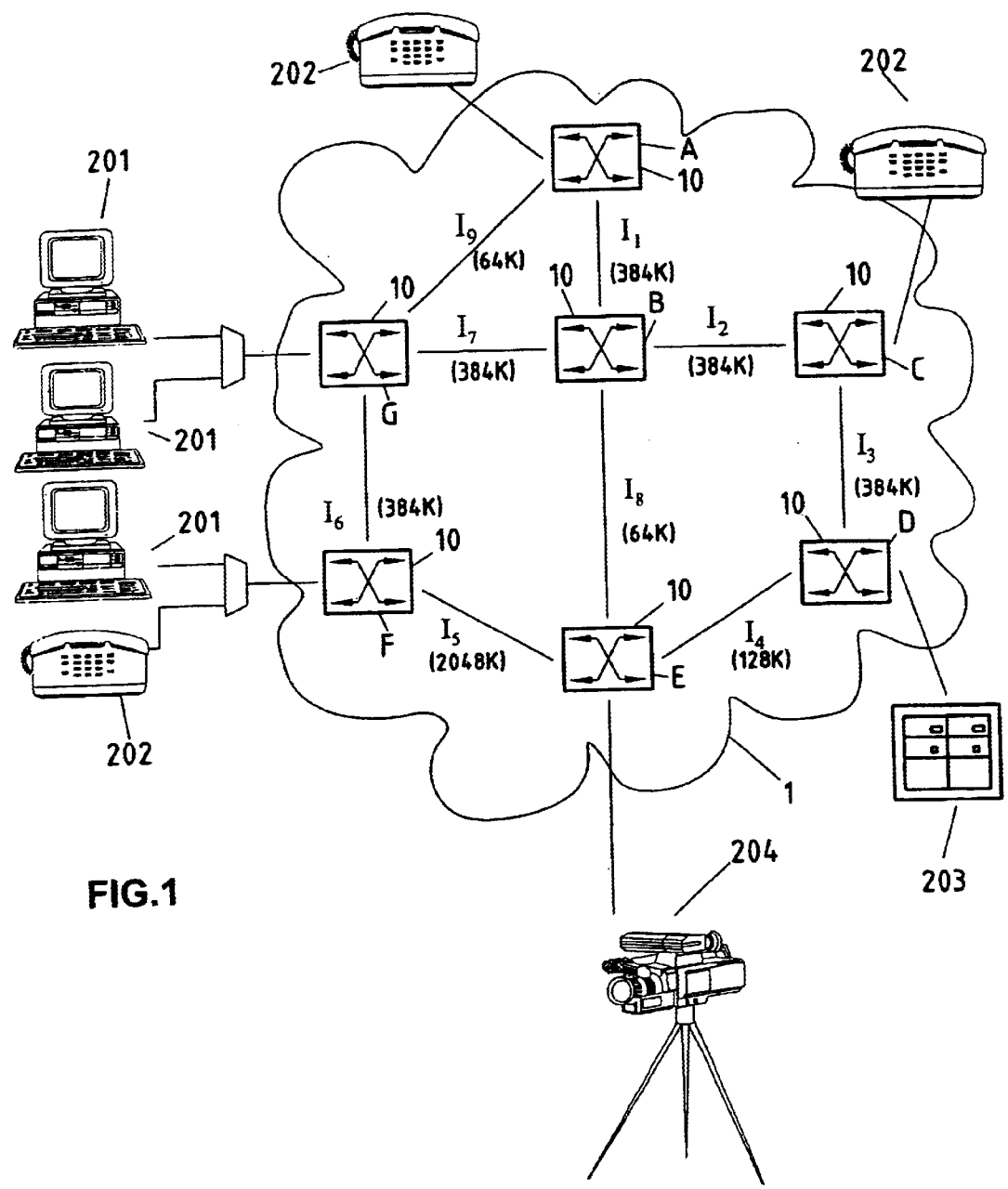
FIG. 1 is an example of a simple ATM-network.

FIG. 1 shows a communication network composed of communication nodes 10, such as switches or gateways, and terminal nodes such as computers 201, phone sets 202, file servers 203, video cameras 204 and so on. Communication nodes and terminal nodes are interconnected with communication links $I_i$. The links $I_i$ correspond to bidirectional communication media. Each link $I_l$ is characterised by its bandwidth B, typically measured in bits/second, and other properties such as delay ([ms]), delay jitter and cell loss rate. The link bandwidths are given in brackets near each link on FIG. 1.

For the sake of simplification, we will consider in the following only the backbone network 1 (consisting only of communication nodes and links between them), and exclude from the other figures and from the summarised representation of the network the access network (consisting of terminal nodes and their links to communication nodes). The method of the invention can however be extended without any difficulties to the representation of a complete network, including terminal nodes, communication nodes and links between them. Such a complete representation may be useful in particular if terminal nodes are connected to multiple networks (for instance a computer simultaneously connected to a company local network and to Internet) and therefore can act also as communication nodes (albeit at a different network layer).

In the following the description will concern more specifically the particular case of an ATM network. The invention can however be applied to any kind of circuit-switched communication network.

Figure 6:
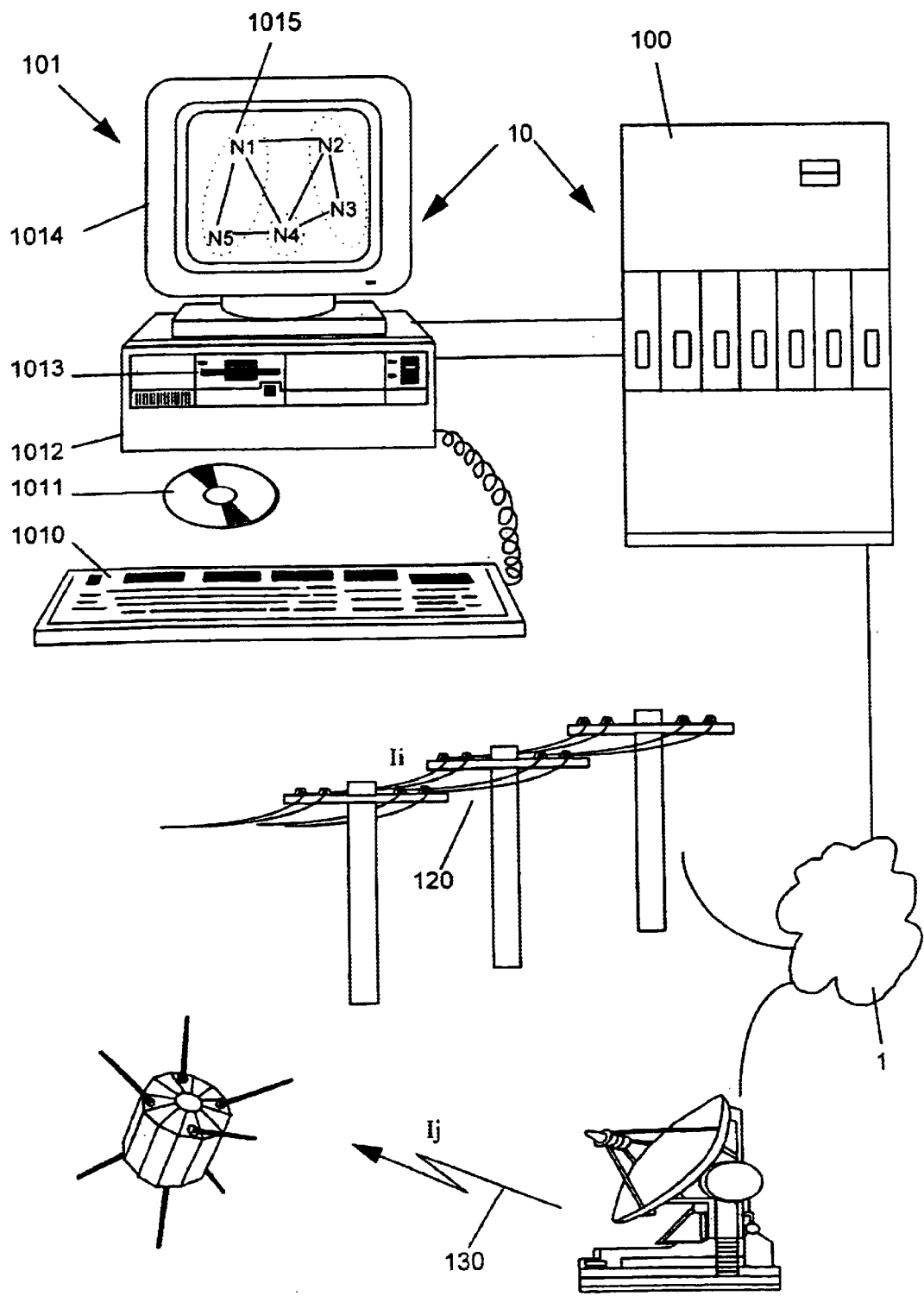
FIG. 6 is a perspective view of an apparatus used for carrying out a centralised management method according to the present invention.
Figure 7:
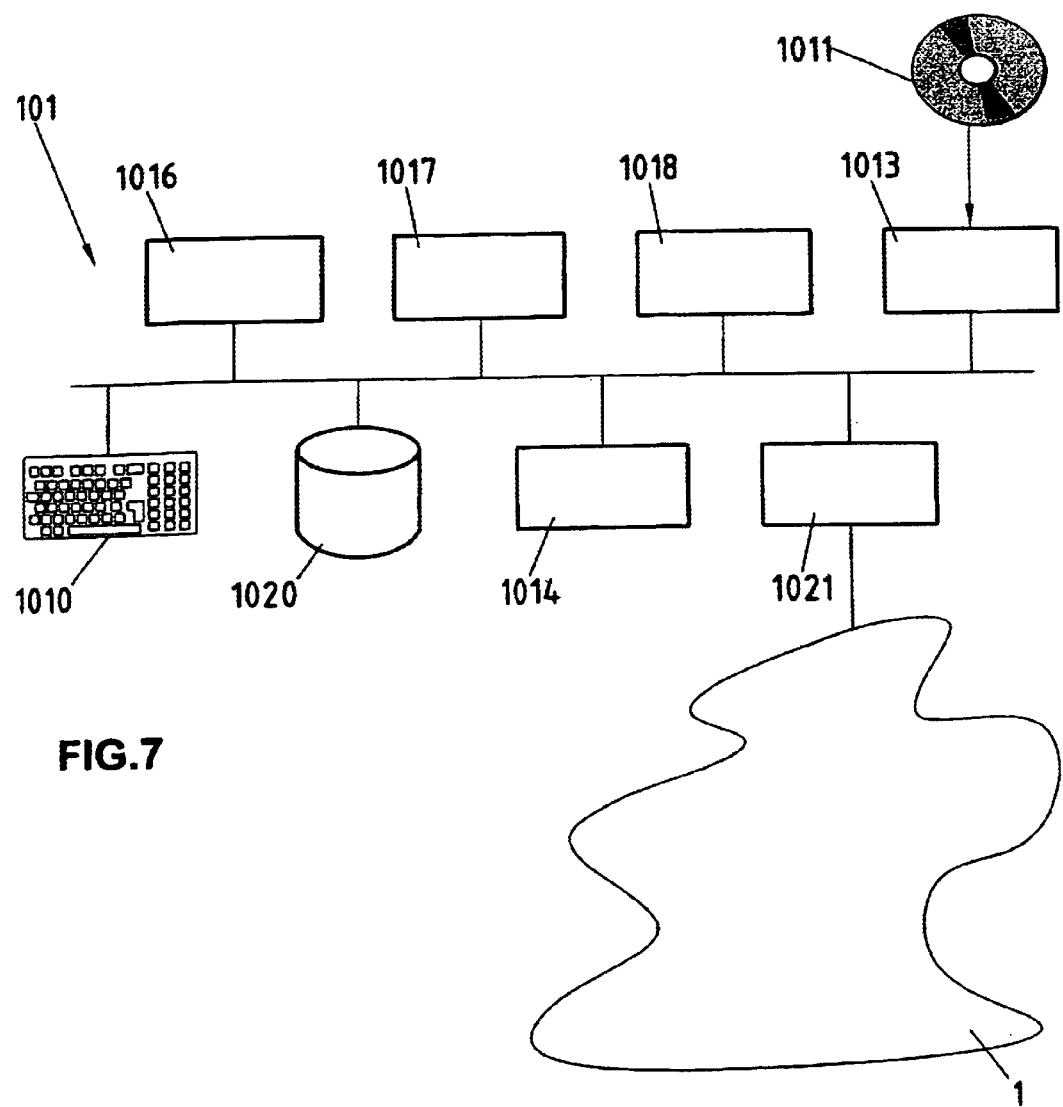
FIG. 7 is a hardware block diagram of the apparatus of FIG. 6.

FIG. 6 is a perspective view of some elements of an ATM network which can be specially configured to perform the claimed method. A switch 10 includes an ATM switching board 100 and a computer 101 for controlling the operations of the switching board 100. The computer 101, also shown in FIG. 7, includes a keyboard 1010, a main unit 1012, a storage device reader such as a CD-ROM drive 1013 and a display 1014. The main unit 1012 comprises a CPU 1016, a ROM 1017, a RAM 1018, a hard disk 1020, and an interface 1021 specially adapted to connect the programmable apparatus 101 to the ATM switching board 100 or directly to the ATM network 1. The computer 101 is specially configured by executing the software stored on the CD-ROM 1011 or on the hard disk 1020 to control the ATM switching board 100 in the claimed manner. The ATM switch 10 is connected to other switches and/or to other computers or terminal nodes in the ATM network by links $I_i$, for instance by low speed copper lines 120, by satellites 130 or other wireless transmission systems, by optical fibres (not shown) or by virtual links (not shown).

The network 1 must fulfil demands for communications between nodes, e.g., phone calls, video conferencing, video on demand, etc. A demand $d_k$ can be defined by the nodes $x_k$ and $y_k$ between which communication is required to take place (the demand's endpoints), and by a parameter $B_k$ describing a quality of service requirement (QoS). In the following part of the description; we will consider the case where $B_k$ depends only on the amount of bandwidth requested. The parameter $B_k$ can be a constant number, for constant bit rate connections (CBR), or a function of time for variable bit rate connections (VBR) or Temporal CBR (TCBR). For the moment, we will only consider the case where $B_k$ is constant.

Figure 2:
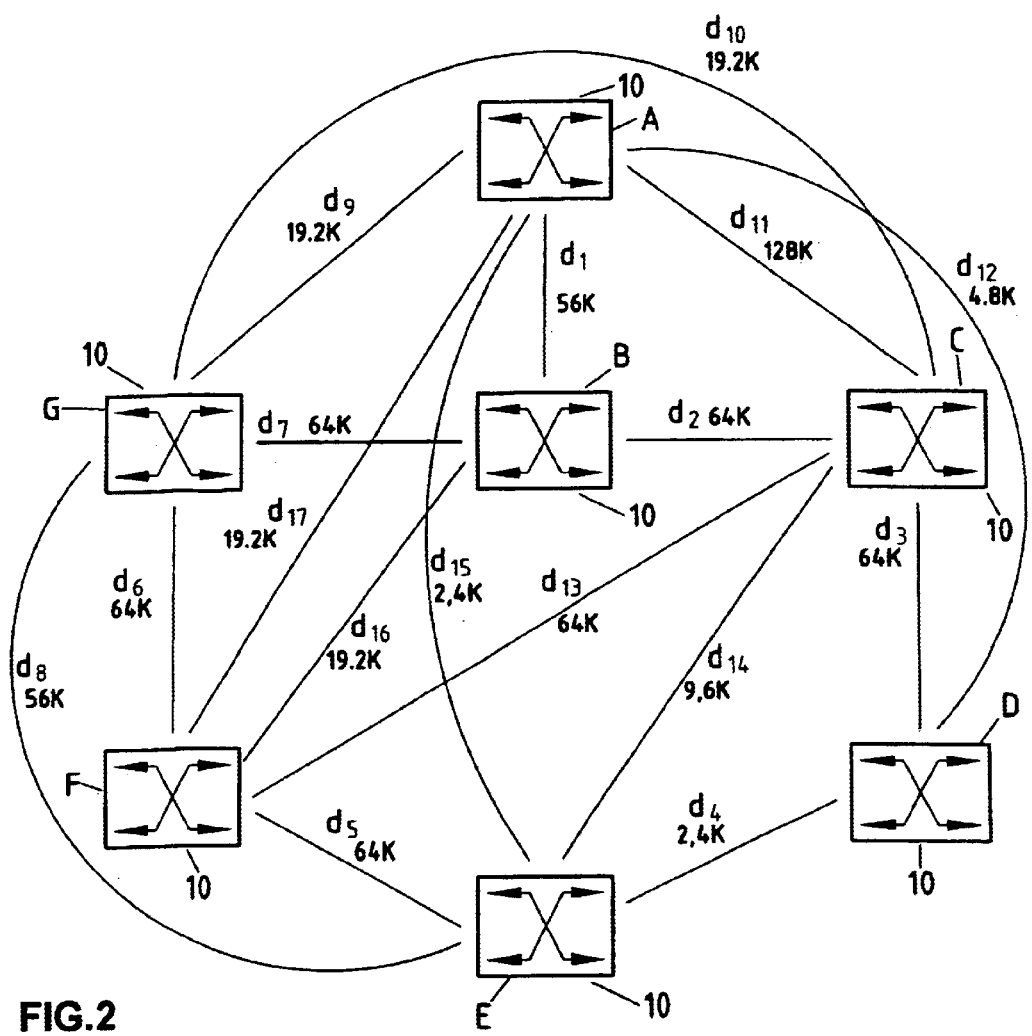
FIG. 2 is a demand graph summarising all the demands in the network of FIG. 1 at a time t.

FIG. 2 shows all the demands $d_k$ arising in the network 1 at a given time t. For instance, FIG. 2 shows that there is demand $d_6$ for establishing a connection between the nodes F and G with a minimum bandwidth of 64 k bits/second.

In order to satisfy a demand $d_k$, a circuit must be allocated between the endpoints $x_k$ and $y_k$ of the demand. This circuit must take a route that satisfies the demand's quality of service requirement. A route is a simple path across the network and thus a set of links. The route computation is ensured by a routing algorithm executed by centralised or distributed routing means. The routing problem is to find one and only one route for each demand satisfying the requested quality of service (bandwidth), and includes to minimise resource utilisation. The routing algorithm must then find for each demand arising in the network a route so that each link and each node of this route has enough available bandwidth to support the demand.

Various approaches are possible for routing a connection through the network. Hop-by-hop routing is used by most current network layer protocols such as Internet Protocol, where a packet is routed at any given node only to another node closer to the final destination. In source routing, the initial node in the path determines the entire route to the final destination. The P-NNI protocol uses a hierarchy of agents which are responsible for routing. The network representation method of the invention however is independent of the routing method and can provide benefits to most routing algorithms.

Once a route has been found, the resources needed along this route are reserved. This process is called establishment of the circuit. Depending on the network technology, either exactly the required bandwidth must be reserved, or at least as many resources as required have to be allocated (e.g., in Time Division Multiplexing networks).

In general, demands do not arise all simultaneously in a communication network. Furthermore, the arrival time of the demands is usually not known in advance. The demands must thus be routed as they arrive. Allocating routes for the first demands has an impact on the routing of the following demands since the former use up some resources that are therefore not available anymore to the latter. The first established circuits may then cause the routing of additional demands to be impossible. The number and requirements of the future incoming demands are generally unknown and therefore there is no way to optimise the allocation in order to ensure that all demands can be routed. Rerouting demands and load balancing, thus have to be considered.

The network management method of the present invention comprises a step of clustering nodes of the network in dynamically defined subsets, called B-blocking islands. This grouping can for instance be made in the representation of the network in the RAM 1018 or on the hard disk 1020 of a communication node 10 of the network. For instance, the storing means 1018, 1020 can store for each node of the network a parameter indicating which B-blocking island it belongs to. Other ways of organising a set of nodes in subsets in an electronic memory can easily be imagined by one skilled in the art of programming. In a various embodiment that will be discussed later, each blocking island corresponds to a subset of nodes in the network assigned to one distributed agent in a network with distributed management. This method of grouping nodes will be used, as we will see, to simplify and improve routing of demands, pricing, analysing and various other management tasks in a circuit-switched communication network.

According to the present invention, the nodes in the network are clustered in sets of nodes, called B-blocking islands, linked in a such a way that at least one route with at least an amount B of available concave resources exists between any pair of nodes in the set at the time t. The B-blocking islands are maximal in term of nodes, i.e., no node outside any B-blocking island exists that can be reached from said B-blocking island with an amount B of concave resources.

Figure 3A:
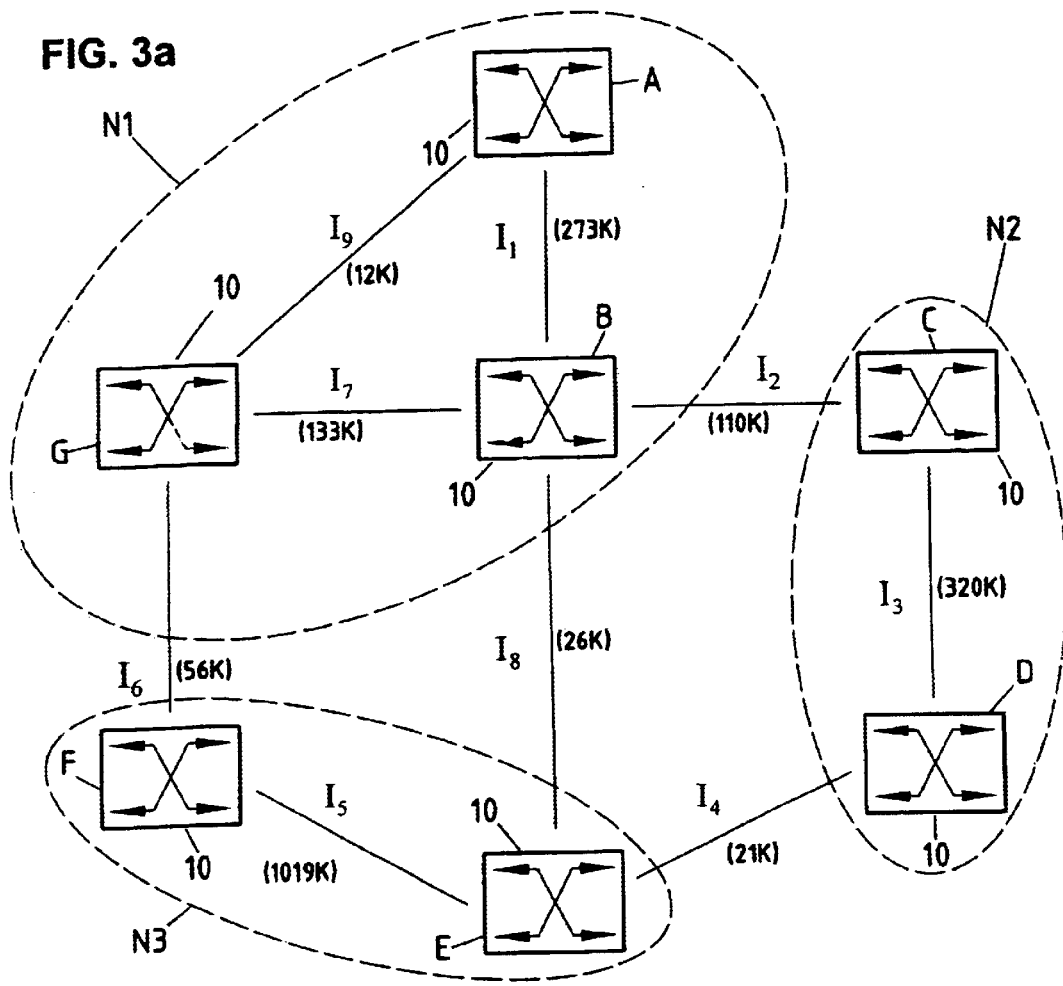
FIG. 3a is a representation of the network of FIG. 1 showing the available bandwidth on each link at the time considered and 128K-blocking islands showed with ovals depicted in broken lines.

FIG. 3a shows the 128K-blocking island at time t for each node of the network of FIG. 1. The number in brackets near each link on FIG. 3a gives the available bandwidth on that link at time t. For instance, 273 Kbits/second are available on link $I_1$ between nodes A and B. Each blocking island N1, N2, N3 is shown with ovals depicted in broken lines. There is at least one available route at time t between each node inside each 128K-blocking island with at least 128K available bandwidth. However, there may be a link $I_i$ with less than B available resources inside a B-blocking island. In such a case, it simply means that there is another route with B available resources between $I_i$'s endpoints. As a matter of fact, in FIG. 3a, the link $I_9$ between nodes A and G has both endpoints in the same 128K-blocking island N1 but has less than 128K bits/second available. There is however a route from A to G through B with 133 K bits/second available.

We can see immediately from the definition of the B-blocking islands that there is one and only one B-blocking island for each node x in the network (in some cases, this B-blocking island comprises only the node x). Moreover, it is possible to show that there is a route between two nodes x and y satisfying the B resources requirement of an unallocated demand if and only if the two endpoints x and y are in the same B-blocking island. The links of any route between x and y with B available resources are all in the B-blocking island of its endpoints x and y.

We will see how those advantageous properties of blocking islands will be used to simplify and improve various management tasks in a circuit-switched communication network.

Figure 3B:
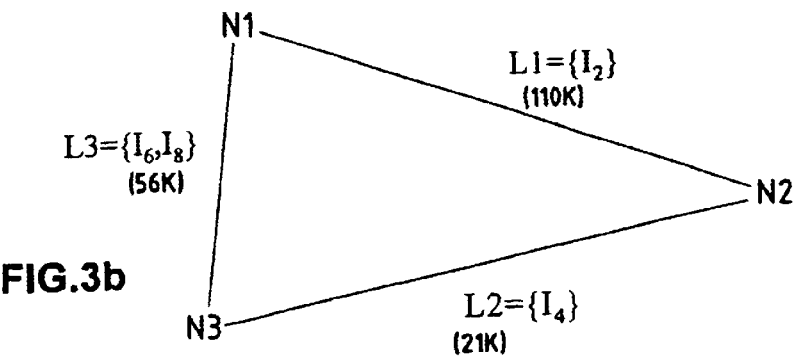
FIG. 3b is a summarised representation of the network of FIG. 3a, with the set of nodes in each 128K-blocking island aggregated in a single node.

FIG. 3b shows a summarised representation of the (backbone) network of FIG. 1 at time t, wherein each 128K blocking island is clustered into a single node. For instance the nodes A, B and G which all belong to the blocking island N1 are replaced in the summarised representation of FIG. 3b by a single node N1. The nodes in the representation of FIG. 3b are linked by B-links L1, L2, L3. As in a circuit-switched communication network, each to communication takes only one route, the available bandwidth of a B-link between two B-blocking islands is the maximum of the available bandwidth of all the links between those B-blocking islands in the representation of FIG. 3a. For instance, the available bandwidth of the B-link $L_3$ between the 128K-blocking islands N1 and N3 is 56K bits/second; the maximum available bandwidth on the links $I_6$, $I_8$ between the blocking islands N1 and N3 in FIG. 3a.

We can see that the summarisation of the representation of network used in FIG. 3b is not limited to clustering nodes: network links that have both endpoints in the same B-blocking island are not shown, and only (critical) B-links between B-blocking island are represented. This representation is thus very simplified and will take up very little space in a memory or very little time to transmit compared to the representation of the complete graph used for FIG. 3a. Still, the representation of FIG. 3a gives immediately very useful information as it identifies all pairs of nodes between which a demand requiring B resources can be allocated: any pair of nodes that are in the same B-blocking island. Conversely, if two network nodes are not in the same B-blocking island, there is no route between them that has B available resources.

In many cases however, the central network management platform still needs to store a complete representation of the network for various tasks. This complete representation can for most operations be stored in a slow and inexpensive memory, such as a hard disk, while the management platform performs most tasks using only a summarised representation of the network loaded in the RAM. In this case, the method of the invention allows trading (total) memory space against execution time.

The B-blocking island N for a given node x of a network can be obtained with a simple greedy algorithm, called the B-blocking island search BIS. Starting with an initial set of nodes N={x}, we recursively add every node to N that can be reached by a link that has at least B available resources. When no more nodes can be added, N is the B-blocking island sought.

The B-blocking island representation of a complete network can be built by first computing all the B-blocking islands, until each node belongs to one B-blocking island. The B-links between B-blocking islands are then obtained by iteration over all the links joining two distinct B-blocking islands: if there is already a B-link L between the B-blocking islands of the endpoints of a link I, then the maximum available bandwidth is recomputed if the available bandwidth over I is bigger than the maximum available bandwidth for L. Otherwise, if no B-link exists between the two B-blocking islands, a new B-link is created and its maximum available bandwidth is the available bandwidth over I.

We see from the preceding that if two points x and y are in the same B-blocking island then there is at least one route with B available resources between x and y. The corollary is that when one and only one endpoint x is in a B-blocking island, then a demand requesting B resources between x and y can not be satisfied: there is no route with B available resources between x and y, otherwise x and y would be in the same B-blocking island. We call a B-blocking island that contains one and only one endpoint x for an unallocated demand d a primary B-blocking island. We will see later that primary blocking islands are very useful for explaining allocation failures for instance in network planning tools. The primary blocking island for a demand d can easily be found by executing the B-blocking island search algorithm with the correct arguments, that is with the network graph, the established circuits, the bandwidth requirement of d and one of d's endpoints.

Figure 4A:
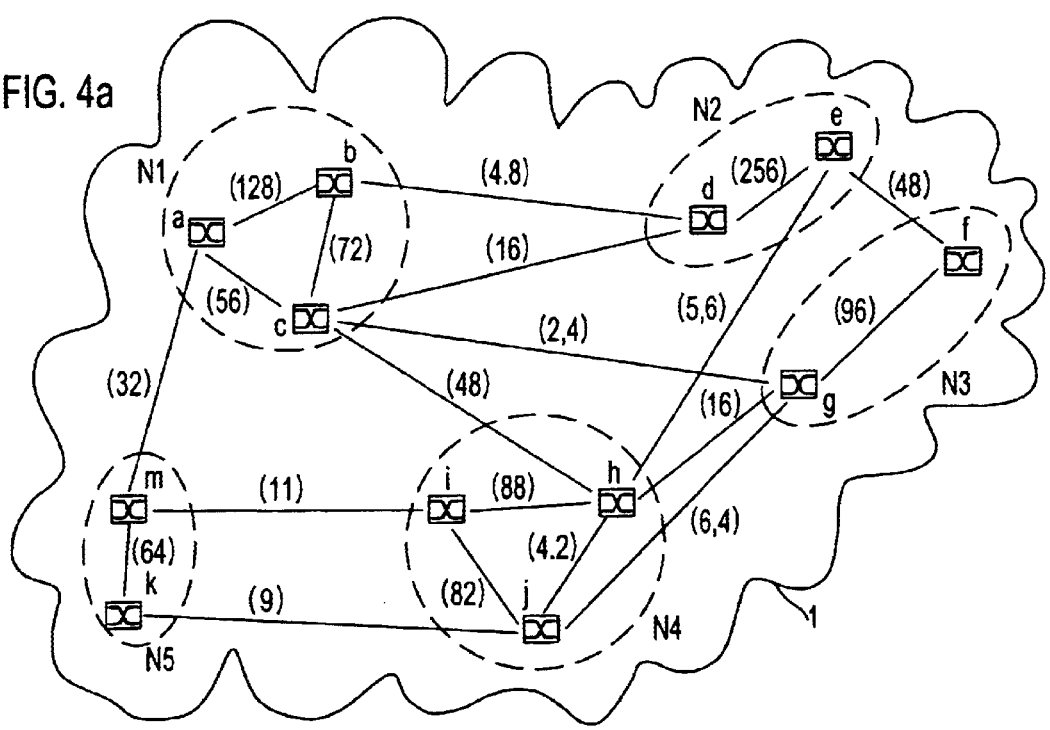
Figure 4B:
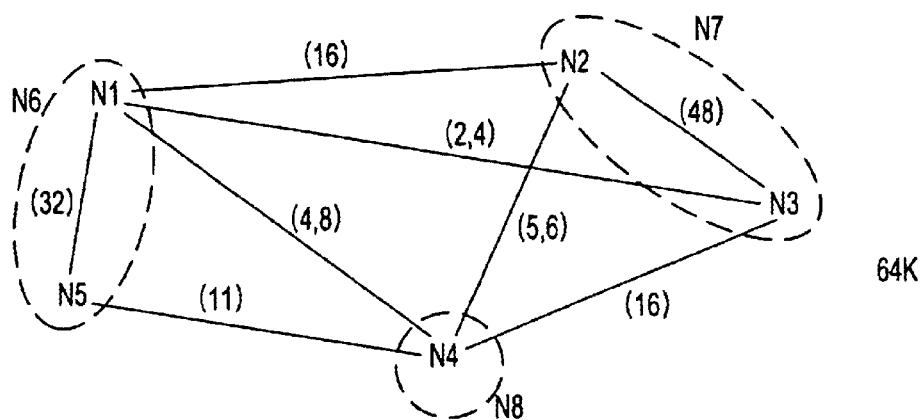
Figure 4C:
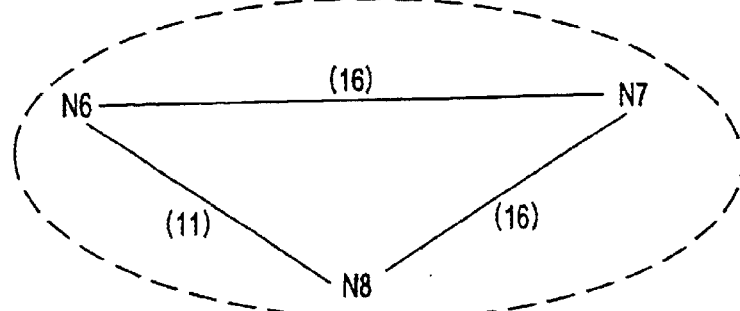

A B-blocking island representation such as the example of FIG. 3 presents only the B-links L1, L2, L3 for a given B. These B-links cannot support a demand requiring B or more bandwidth. It would be useful however to know the bottlenecks for different Bs, e.g., for typical possible bandwidth requirements. A possible but costly solution is to compute and store a separate blocking island representation for each requirement B. According to a preferred embodiment of the present invention, a recursive decomposition of $B_i$-blocking islands in decreasing order of $B_i$ is built: $B_1 > B_2 > \ldots > B_b = 0$. This method is explained in FIG. 4 for bandwidth requirements $B_f = \{\text{"maximal speed"}, 64K, 19.2K, 0K\}$. FIG. 4a shows a representation of a complete circuit-switched communication network 1. The number in brackets near each link shows the available bandwidth at the time t considered. FIG. 4b shows the next (higher) level of the hierarchy of $B_i$-blocking island representations: all the nodes of the network linked in a such a way that at least a route with at least an amount $B_i = 64$ Kbits/second exists between any pair of nodes in the set at the time t are clustered in 64K-blocking islands N1–N5. FIG. 4c shows a representation computed directly from the 64K-representation of FIG. 4b: the 64K-blocking islands are themselves clustered in 19.2K-blocking islands. For instance, the 64K blocking islands N1 and N5 in the representation of FIG. 4b are joined by a link with 32K available bandwidth: in the 19.2K representation of FIG. 4c, they are therefore clustered into one 19.2K blocking island N6. FIG. 4d show the zero K representation of the network: since all nodes in this network are connected, there is at least one route between each node of the network with at least zero K available bandwidth. This highest level of representation therefore clusters the whole network into one node N9. Each level of the blocking island hierarchy is computed from the lower level with the same algorithm used for building the first level of the hierarchy from the nodes of the networks.

In most networks, only a limited amount of predetermined bandwidth requirements are used, for instance, 9.6 Kbits/s for a phone call. A blocking island hierarchy will preferably be built with those most common predetermined bandwidth requirements, for example $B_1 = 128K$, $B_2 = 64K$, $B_3 = 28.8K$, $B_4 = 14.4K$, $B_5 = 9.6K$, $B_6 = 2.4K$ and $B_7 = 0K$. The set of $B_i$ values and/or the number of levels in the blocking island hierarchy could also change dynamically according to new bandwidth requirements.

Figure 5:
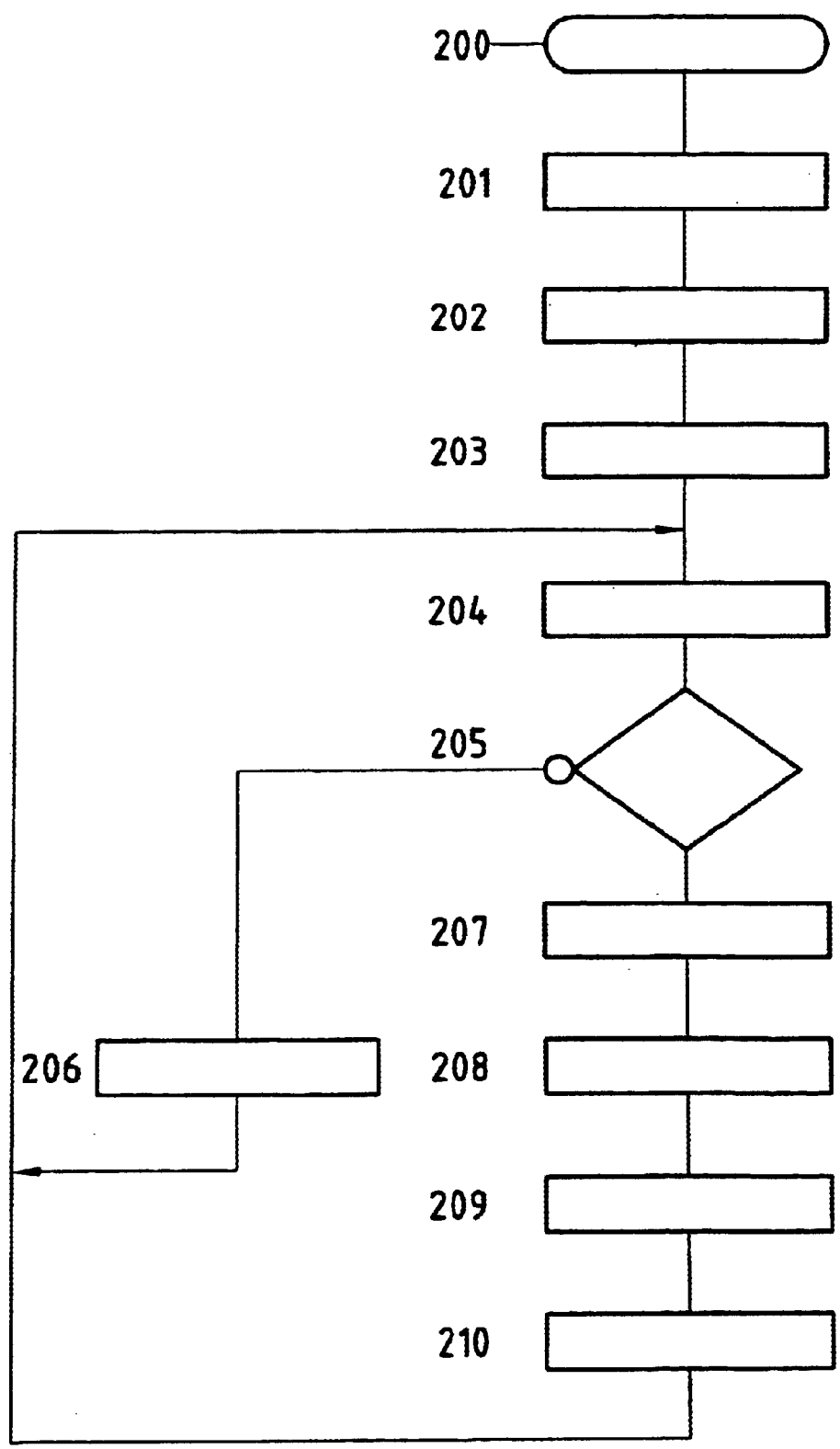
FIG. 5 is a flow chart illustrating the steps executed by a device for carrying out the method of the present invention.

FIG. 5 is a flowchart indicating the main steps carried out by a central management platform (which may be implemented by the device 10 illustrated in FIG. 6), performing the routing method of the invention. The method starts with step 200 (initialisation at network boot). The routing device then gets information about the topology of at least a part of the network it is responsible for (step 201), i.e., receives and stores a list of nodes and links interconnecting those nodes. This information can be entered by an operator on the keyboard 1010, transmitted via the network and the interface 1021 from other connected devices, or entered from a graphical network editor or from a network discovery tool. The processing unit 1012 then computes a summarised representation of the network with one or more level of B-blocking islands (step 202), and stores this blocking island hierarchy representation on a storing device such as a memory or a hard disk (step 203).

The routing device then receives a new demand d for interconnecting two nodes x and y in the network 1 with a requested quality of service B. (step 204). At step 205, the routing device checks if a route exists for d in the network. This check is very easy to carry out: a route exists if and only if the two endpoints x and y are in the same B-blocking island at a level B of the representation stored, with $B \geq B_r$. For instance, in the example of FIG. 4, the routing device can immediately determine that a route with a requested bandwidth $B_r = 64$ Kbit/second exists between the endpoints A and C, as those nodes both belong to the same 64K-blocking island N1 stored in the B=64K representation of the network. If no route exists, the demand is rejected at step 206 (we will see later that the method of the invention provides for easy explanation of those allocations failures). If a route exists, the routing device can use any known QoS routing algorithm to take also in account the other QoS parameters (e.g., delay) to find a route (step 207).

We have seen above that if a route exists for a demand requesting a bandwidth $B_r$, then all the links of that route belong the B-blocking island containing the endpoints of that demand, with $B \geq B_r$. The search space for the routing algorithm used at step 207 can thus be reduced to the subnetwork summarised by the B-blocking island containing the two endpoints of the demand. Even better, the search space of the routing algorithm should be set to the B-blocking island containing the two endpoints for the demand with the greatest B ($B \geq B_r$) in the blocking island hierarchy to restrict it even more. For instance, in FIG. 4, the search space for a demand requesting a bandwidth $B_r = 19.2$ Kbits/second between a and c should be confined to the 64K-blocking island N1 (instead of the 19.2K-blocking island N6) since a and c belong to the same 64K-blocking island N1. This choice has two beneficial side effects: the more the search space is reduced, the fewer alternative routes there are available, thus facilitating the choice of a route; it also achieves a good balancing effect because the lower the level of the $B_i$-blocking island in the hierarchy (i.e., the higher the $B_i$), the more available bandwidth there is on the links it clusters.

Even in a low-level $B_i$-blocking-island, it can happen that more than one route exists between two nodes x and y. The "best" route among those found by the routing algorithm at step 207 is chosen during step 208 (note that this choice can only be a best guess because the router cannot predict the future demands). The best route among the possible ones can-be chosen with the length criterion (the fewer links in the route, the fewer resources used) and a with other requested properties for the quality of service (delay, delay jitter, etc.). The representation of the network summarised in blocking islands in the storing means gives however new means to decide upon the "best" route. We know that the higher a link appears in the hierarchy of representations, the more bandwidth-critical it is. Comparison of two routes can then be based on the criticalness of their links, or at which level in the hierarchy each route appears. Another way to compare routes during step 208 is to analyse the consequences each route has on the blocking island hierarchical representation. The best route is the route that causes the fewer splits of blocking islands. Comparison of two routes can also be based on another QoS parameters: in this case, the blocking island hierarchy acts as a first filter. One could also build a blocking island hierarchy for bandwidth and another for another service caracteristic, for example cell loss rate. Both can then filter in parallel.

When the "best" route has been chosen, the circuit can be established for that demand, i.e., the requested resources are reserved on each link between x and y along the chosen route (step 209).

Once the circuit has been established for the demand, the blocking island hierarchy stored in a memory during step 203 needs to be adapted. In particular, the available resources on the links that compose the route must be fewer. This adaptation is made during step 210. We will see that the blocking island heirarchy needs also to be adapted or maintained on various other occasions, especially when a circuit has been deallocated.

The diminishment of the available resources on a link I may cause the splitting of a B-blocking island containing I into two separate B-blocking islands. For each link I over which the demand was routed, the device checks if the additional load causes a blocking-island to be split, i.e., if a route with at least an amount B of resources does not exist anymore between any pair of nodes in the blocking island after the allocation of resources. Note that if a splitting is required at level $B_1$ of the blocking island hierarchy, a splitting will also be required at each previous level $B_2 > B_1$, if it is not already the case.

The method used for updating the blocking island hierarchy after establishment of a new circuit is thus the following:

The device first computes for each link I over which the demand was routed the lowest level $B_i$ at which the link I is hidden in a blocking island. At the preceding level $B_{i-1}$, the link appears in the summarised representation. Therefore, if splittings have to be done, the first one will occur at $B_i$. The device then checks if a splitting is required. This is the case if, and only if, the link I has fewer than $B_i$ resources available after the new allocation, and if there is no other route between the endpoints of I that has at least $B_i$ resources available. If splitting has to be done, the device splits the $B_i$ blocking island into two $B_i$ blocking islands and computes the new links between the two new $B_i$ blocking islands. Splitting at the next hierarchical level is then conducted if required.

There are other circumstances where the representation of the state of the network must be adapted. Communication needs arise and disappear, and therefore new circuits must be established and existing ones deallocated. Moreover, a link may break down, or the characteristics of a link can be improved, leading to more available resources, or even the network topology can change, for instance when adding a new link. These changes in resource availability must be taken in account by adapting the blocking island representation stored. According to the invention, the blocking island hierarchy can be adapted dynamically without recomputing it from scratch.

When an established circuit has to be deallocated because the connection is no longer needed, resources are freed on the links over which the circuit is routed. If enough resources have been freed on a link I joining two B-blocking islands to allow a new demand with B bandwidth requirement to be routed over I, the two B-blocking islands must be merged. Therefore, the deallocation of a circuit can lead to merging of two blocking islands at each level of the blocking island hierarchy and for each link over which the demand is routed.

A method for updating the blocking island hierarchy after deallocation of an established circuit would be, for instance:

During a first step, the device computes for each link over which the demand was routed the lowest level in the hierarchy of blocking islands where two blocking islands must be merged. This is the biggest bandwidth requirement B that I can satisfy, given the remaining established circuits. Merging of the two B-blocking islands containing each endpoint of the link I is then done if, and only if, B is non-zero and if the link I is not already clustered in a B-blocking island. Merging is then done recursively at each next level (if not already accomplished).

Other special events that may occur in a communication network and have an effect on the blocking island hierarchy include:

Rerouting of demands. The procedure to apply in that case is to deallocate the old circuit and add the new one. In that case, the blocking island hierarchy stored in the device helps in solving the rerouting of a demand problem: it reduces the search space to the B-blocking island of the demand's endpoint. Additionally, as explained, it provides valuable evaluation criteria for choosing between alternative routes.

Link failure or link removal can be processed similarly to circuit addition: there are no available resources on the link. All established circuits using that link are down and must be removed.

When altering the properties of a link, two cases must be considered: either the link's bandwidth resources have been increased or diminished. The former is the same as if a connection has been removed, and the latter is the same as if a new one has been established.

When adding a link, a circuit removal-like procedure is applied: it is the same as if a circuit is removed on a link which had no available resources before.

Node failure or node removal implies also the removal of all links the node is connected to. The node must be removed from all the blocking islands it belongs to and link removal treated as specified above.

Node addition makes sense only when at least a link connecting it to other nodes is added. A new blocking island must be created at each level of the hierarchy, and link addition can then be conducted as explained above.

As already suggested, the computing and storing of a summarised representation of a network with blocking islands allows for easily finding the critical links of the network. This property can be used for rerouting connections. As already explained, links joining blocking islands are more critical than links inside blocking islands, specially at higher levels in the hierarchy of blocking islands. Therefore, a connection between two endpoints that use more critical links at level $B_i$ of the hierarchy than necessary (zig-zag connections) should be rerouted. For instance, on FIG. 3a, a connection between G and B via the nodes F and E use the two critical links $I_6$ and $I_8$ between the blocking islands N1 and N3; this connection should be rerouted such as to use only the non-critical link I7, or possibly via the non-critical links $I_1$ and $I_9$, in order to free up resources on the critical links. This <<zig-zag reduction>> rerouting method can be used for instance in a central management platform or in a stand-alone network planning tool.

The higher a link appears as a link joining two blocking islands in the hierarchy, the more critical it is, and the more expensive it should be to use. According to another aspect of the invention, this-information is used for determining the price of a communication using that link, possibly in conjunction with other parameters such as duration, time, bandwidth, distance and quality of service requirement. Pricing then obeys supply and demand-like laws.

This method has the advantage that the price is really based on the criticalness of a link, not on the available bandwidth a link I with low available bandwidth (even 0) is not a critical link if there is a route with plenty of available resources on other routes between the endpoints of I.

According to still another aspect of the present invention, a blocking island hierarchy is used and/or established in a network planning tool to design a new communication network or analyse and modify an existing one. The network planning tool can be implemented by a general purpose computer such as the computer 101 illustrated in FIG. 5, specially configured by executing software stored on a computer-usable medium. The program code instructions stored on a floppy disc, on a hard disk or on a CD-ROM 101 are read by an appropriate driver 1013. The instructions are transferred to the RAM and executed by the CPU of the computer.

The program code instructions cause the CPU to prompt the user to enter a description of the topology of the network. The description can be entered via the keyboard 1010 and/or with a mouse and a graphical interface.

In a variant embodiment illustrated in FIG. 6, the computer is connected to the circuit-switched communication network and can for instance gather information itself about the network's topology.

Then, the program code instructions cause the CPU to generate or measure the expected demands over the network and to find routes for those demands by simulating the routing algorithm which is to be used. The program code instructions simultaneously cause the CPU to build and maintain a representation of the state of the simulated network taking in account each circuit establishment and using a blocking island hierarchy. Blocking islands are merged or split depending on the establishment and deallocation of circuits. This representation may be stored in a dynamic memory and/or on the hard disk, and displayed on the display 1014 of the computer. Preferably, the software gives the user the possibility to zoom in and out at various parts of the network and to explore the different levels of the hierarchy.

In the case of allocation failures; i.e., if the available resources do not suffice to route a new demand, the representation of the network using blocking islands is very effective for explaining why the allocation failed. For instance, the representation displayed on display 1014 can highlight the two disjoint primary blocking islands for unallocated demands (one for each endpoint of the demands) and the bottleneck links between those two primary blocking islands. This information may be used by the network operator to evaluate the routing algorithm which is intended to be used, and the topology of the network: as bottlenecks are identified, a blocking island hierarchy provides valuable information for the network manager about where to add a new link or which link's resources must be increased in order to resolve and prevent allocation failures. Considering several levels in the blocking islands hierarchy helps to determine the minimal number of links to add, and where to add them namely between blocking islands. The summarised representation with blocking islands can also be used to check if an existing network may support the foreseen additional load, given a maximum threshold of rejected connections.

One skilled in the art will recognise that the method of the invention applied to a network planning tool allows a summarised representation, using much less memory space to be extracted from an exhaustive representation of a network. The operator can choose the number of nodes the network planning tool has to display by changing the level of the hierarchy of blocking islands he presently looks at. Thus, the operator can directly act upon the working speed of the network simulation: a rough representation of the state of the network can be quickly obtained by displaying only the highest levels of the blocking island hierarchy. Moreover, as already explained, the routing simulated by the network planning tool can be made much quicker by restricting the search space for the routing algorithm used to all the nodes belonging to the B-blocking island containing the two endpoints of the simulated demands.

According to still another aspect of the present invention, a blocking island hierarchy is established and used in a network planning tool for planning connections which must be established and resources which must be reserved on different links when the requirements and the arrival time of the demands are both known in advance. This may be the case for instance when a telecommunication user informs his network operator in advance about the demands he will generate at a given time. The network operator then uses a stand-alone network planning tool for finding a strategy for transferring the requested demands using a minimal amount of resources. The network planning tool uses a network simulator, having the same behaviour as the actual network for generating the expected demands, finding routes by simulating the routing algorithm which is to be used, and establishing the circuits. Displaying the blocking island hierarchy helps to provide explanations in case of allocation failures and information about where to increase resources or when to reroute connections in order to transfer all the requested demands with a minimal amount of resources. Considering several layers in the blocking island hierarchy helps to determine the minimal number of link's resources to add, and where to add them: between blocking islands.

The above description relates more particularly to the case of a centrally managed network. In order to overcome the increasing difficulty of management and planning, due to network size, it may be more advantageous to distribute it to agents. Each blocking island is ruled by an autonomous agent, the blocking island leader, which is responsible for resource allocation and management in its domain, the blocking island. An agent is preferably implemented by a software module or program code executed by a programmable apparatus embedded in one of the nodes inside the ruled blocking island. Each agent is ruled by one higher level agent (his "father") ruling over a blocking island on the next layer of the blocking island hierarchy. The top level leader, responsible for the zero K blocking island, is then the highest agent in charge.

The construction of the blocking-island hierarchy at network boot can be distributed. The top leader first computes a blocking island representation for the smallest bandwidth requirement, and then creates a child-agent ruling over each blocking island created. These child agents can be created and distributed for instance by techniques well known. Each child agent then divides his domain according to the next smallest bandwidth requirement. This is done recursively until agents for the biggest bandwidth requirement are established.

Circuit establishing is effectively managed by the agents. When a new demand arises, issued by a network node x which needs to communicate with another node y at B bits/second, x asks his direct leader to establish that connection. The leader passes on the demand to its own leader, until the leader at B level is reached (B-leader). The latter is then responsible for establishing a circuit for the new demand, that is, for finding a route satisfying the requested quality of service constraint and for reserving the required resources along the chosen route. The B-leader does not have to communicate with peer agents in order to negotiate resources because any route satisfying the new demand uses only resources he is responsible for. The B-leader may however communicate with subordinate agents when finding a route. Circuit deallocation and rerouting will be conducted in a similar manner.

One skilled in the art will recognise that the domain ruled by the distributed agents reflects the current resource availability: an agent leading a B-blocking island can allocate B bandwidth between any two nodes in its blocking island. As a result, little co-operation and negotiation between agents is required.

According to another aspect of the present invention, pricing can also be managed by the distribution agent hierarchy. In this case, the price of a communication may depend on the hierarchical level of the agents mobilised for establishing the communication.

The preceding description relates more particularly to the special case of point-to-point demands. The present invention however can also-be used for routing, pricing and planning of multipoint demands, i.e., demands that require data exchange between more than two nodes, such as television or video-conferencing between more than two people. A multipoint demand can be routed if, and only if, all its endpoints are in the same blocking island for the requested amount of resources.

Up to now, demands were supposed to require a constant amount of bandwidth over time. The method of the invention however also applies to managing and allocating other resources. In fact, the method can be used for managing any concave metric $\mu$, wherein a metric $\mu$ for a link I is said to be concave if for any path p over the links $\{I_1, \ldots I_p, \ldots I_p\}$, $\mu(p)=\min \mu(I_j)$.

Moreover, the invention applies to demands with bandwidth requirement B(t) that vary over time (variable bit rate, VBR connections, or Temporal CBR, TBCR). This is typically the case when Internet surfing, for instance: when loading a page on the world wide web, data must be transferred at a maximal speed; however, when reading that page, the connection is idle. Such a variable bit rate connection may be approximated by a constant bit rate connection, where the constant bandwidth requirement is the highest peak, and a circuit can be established with that bandwidth. However, a lot of resources are wasted that way. It is therefore much better to establish a variable bit rate connection at the price of more complex connection admission controls (CACs). Martin de Prycker describes in *Asynchronous Transfer Mode: Solution for Broadband ISDN*, Prentice Hall, 3rd edition, 1995, a method for establishing a variable bit rate connection in an ATM network.

We say that the resources requirements $B_i(t)$ are totally ordered if, for any Bi(t), Bj(t), there is either a relation $B_i(t)<=B_j(t)$ or $B_j(t)<=B_i(t)$, where $B_i(t)<=B_j(t)$ means that if a link I has enough available resources for a demand requiring $B_j(t)$, I can support a demand requiring $B_i(t)$. This is the case for instance when for each pair of demands occurring in a network and for each time t, one demand requires less or the same amount of resources than the other. In this special case, the blocking island hierarchy has the same properties as a blocking island hierarchy for constant bandwidth and can be built, managed and maintained in the same way.

If, however, two bandwidths requirements cannot always be compared independently of the established circuits on a link, we say that the bandwidth requirements are only partially ordered. In this case, it is easy to show that blocking islands may have more than one father, and be the child of more than one other blocking island. The blocking island hierarchy is then more complicated to build, visit and exploit. In fact the blocking island hierarchy for partially ordered resource requirements is no longer a tree, but a lattice. Distributing this blocking island hierarchy may require more sophisticated collaboration and negotiation protocols between agents since each agent may have several fathers; agents are not arranged in a purely hierarchical system. Conflict resolution is conducted by the lowest agent that supervises the agents in conflict; that lowest agent may then not be the direct leader of the agents in conflict.

What is claimed is:

1. A method of management in a circuit-switched communication network (1), the method being performed on, or with the aid of, at least one programmable device (10) connected to said network, comprising:
   computing (202) and storing (203) in an electronic memory (1018, 1020) a representation of the network based on B-blocking islands ($N_i$), wherein a B-blocking island is a grouping of subsets of nodes assigned to a distributed agent;
   each B-blocking island comprising:
   a maximal set of nodes (A–G) linked in a such a way that at least one route with at least an amount B of concave resources exists between any pair of nodes in the set at the time t.

2. Method according to claim 1, further comprising:
   organizing said Bi-blocking islands ($N_i$) in a hierarchy, wherein a hierarchical position of each $B_i$-blocking island depends on the choice of the value $B_i$ used for defining said blocking island.

3. Method according to claim 2, wherein said values $B_i$ used for defining the blocking island hierarchy are predefined according to common resources requirements.

4. Method according to claim 3, further comprising:
   changing dynamically said values $B_i$ used for defining the blocking island hierarchy.

5. Method according to one of the claim 2, further comprising:
   dynamically merging at least one hierarchical level two B-blocking islands when deallocation of an established circuit in said network (1) has freed enough resources on a link ($I_i$) between said two B-blocking islands ($N_i$) such that at least an amount B of resources is available on said link ($I_i$).

6. Method according to one of the claim 2, further comprising:
   dynamically splitting at least one hierarchical level a B-blocking island ($N_i$) when establishment of a new circuit using at least one link between two nodes inside said B-blocking island uses too many resources to allow a route with at least an amount B of resources between any pair of nodes inside said B-blocking island.

7. Method according to one of the claim 2, further comprising:
   updating said B-blocking island hierarchy in the case of rerouting of demands, link failure or link removal, alteration of the properties of a link, adding of a link, node failure, node removal or node addition.

8. Method according to one of the claim 1, said method configured to find a path between at least two nodes (A–G) in a circuit-switched communication network (1) with at least an amount b of resources available, a search of said path being confined to a B-blocking island comprising at least two said nodes, and B being bigger than b.

9. Method according to claim 8, further comprising:
   selecting the most suitable path by analyzing the impact each path has on the structure of blocking islands hierarchy.

10. Method according to claim 8, further comprising:
    selecting the most suitable path by comparing at which level of the B-blocking island hierarchy each route appears.

11. Method according to the claim 8, wherein search space for a demand of the routing algorithm is reduced to the subnetwork summarized by the B-blocking island with a greatest predefined B that contains the endpoints of said demand.

12. Method according to claim 2, said method configured to reroute connections that use more critical links at level $B_i$ of the hierarchy than necessary (zig-zag connections).

13. Method according to claim 2, said method configured to determine the price of a communication, said price being dependent at least partially on the hierarchical level of the links ($I_i$) used by the circuit established for the communication in said hierarchy of B-blocking islands.

14. Method according to claim 2, said method configured to analyze the behavior of an existing circuit-switched communication network or planning the construction of a new circuit-switched communication network or the modification of an existing circuit-switched communication network.

15. Method according to one of the claim 1, said method being based on a hierarchy of autonomous intelligent agents, each agent being responsible for a set of nodes in said circuit-switched communication network, with higher level agents arbitrating conflicts between peer agents, each agent being responsible for a dynamically defined set of nodes ($N_i$) consisting of nodes linked in a such a way that at least a route with at least an amount B of concave resources exists between any pair of nodes in the set at the time t, and a level of the agents in said hierarchy are dependent on a choice of the value B used for defining said set of nodes.

16. Method according to claim 15, said method configured to route demands between at least two nodes in a circuit-switched communication network (1), and comprising the following steps undertaken when a new demand arises issued by a network node x which needs to communicate with at least one other node y, an amount B of resources being requested for that communication:

first the node x asks the agent responsible for the node x with the lowest level in the hierarchy of agents to establish a circuit for said new demand, said agent passes on this demand to the agent at the next level in the hierarchy, until the agent at the level B is reached, which then finds a route between x and y and establishes the circuit.

17. Method according to claim 15, said method configured to determine a price of a communication, said price being dependent at least partially on the hierarchical level of the links ($I_i$) used by the circuit established for the communication in said hierarchy of blocking islands.

18. Method according to claim 1, wherein said resource used for determining the nodes belonging to the same B-blocking island is the bandwidth.

19. Method according to claim 1, performed on a central hardware and software management platform (10).

20. Method according to claim 1, performed by distributed communication and/or terminal nodes in the network.

21. Method according to claim 1, wherein said circuit-switched communication network (1) is an ATM network.

22. Method according to claim 21, said method being used for a connection admission control function (CAC) in an ATM switch (10), the routing module of the connection admission control employing a blocking island hierarchy.

23. Method according to claim 1, wherein said circuit-switched communication network (1) is a SDH network.

24. Method according to claim 1, wherein said circuit-switched communication network (1) is a RSVP and TCP/IP network.

25. Method according to claim 1, wherein said circuit-switched communication network (1) is a TDM network.

26. A device (10) which can be used as a terminal node or as a communication node in a circuit-switched communication network (1), comprising:

means (1016, 1018, 1020) for computing a representation of the network based on B-blocking islands ($N_i$), each B-blocking island comprising a maximal set of concave nodes linked in a such a way that at least one route with at least an amount B of resources exists between any pair of nodes in the set at the time t; and means (1018, 1020) for storing said representation, wherein a B-blocking island is a grouping of subsets of nodes assigned to a distributed agent.

27. Device according to claim 26, further comprising:

means for organizing said B-blocking islands ($N_i$) in a hierarchy, wherein the hierarchical position of each $B_i$-blocking island depends on the choice of the value $B_i$ used for defining said blocking island.

28. Device according to claim 27, wherein said values Bi used for defining the blocking island hierarchy are predefined according to common resources requirements.

29. Device according to claim 28, further comprising:

means for dynamically changing said values $B_i$ used for defining the blocking island hierarchy.

30. Device according to claim 26, further comprising:

means for dynamically merging at least one hierarchical level two B-blocking islands ($N_i$) when deallocation of an established circuit in said network has freed enough resources on a link ($I_i$) between said two B-blocking islands such that at least an amount B of resources is available on said link ($I_i$).

31. Device according to claim 26, further comprising:

means for dynamically splitting at least one hierarchical level a B-blocking island when establishment of a new circuit using at least one link between two nodes inside said B-blocking island uses too many resources to allow a route with at least an amount B of resources between any pair of nodes inside said B-blocking island.

32. Device according to claim 26, further comprising:

means for updating said B-blocking island hierarchy in the case of rerouting of demands, link failure or link removal, alteration of the properties of a link, adding of a link, node failure, node removal or node addition.

33. Device according to claim 26, further comprising:

routing means for finding a path between at least two nodes (A–G) in said circuit-switched communication network (1) with at least an amount b of resources available, wherein said routing means use said storing means to confine the search of said path to a B-blocking island comprising at least two said nodes, B being bigger than b.

34. Device according to claim 33, further comprising:

means for selecting the most suitable path by analyzing the impact each path has on the structure of the blocking islands hierarchy.

35. Device according to claim 33, further comprising:

means for selecting the most suitable path by comparing at which level of the B-blocking island hierarchy each route appears.

36. Device according to the claim 33, further comprising:

means for reducing the search space for a demand of the routing algorithm to the subnetwork summarized by the B-blocking island with the greatest predefined B that contains the endpoints of said demand.

37. Device according to claim 26, said device being a price determination device configured to determine the price of a communication, wherein said price depends at least partially on the hierarchical level of the links ($I_i$) used by the circuit established for the communication in said hierarchy of blocking islands.

38. Device according to claim 26, said device being a network planning tool configured to analyze the behavior of an existing circuit-switched communication network or planning the construction of a new circuit-switched communication network and the modification of an existing circuit-switched communication network.

39. Device according to claim 26, further comprising:
means (1021) to connect it to said circuit-switched communication network (1).

40. Device according to claim 39, being a central hardware and software management platform in a circuit-switched communication network (1).

41. Device according to claim 39, being a local terminal or communication node in a circuit-switched communication network (1) with distributed management.

42. Device according to claim 41, wherein said distributed management is based on a hierarchy of autonomous intelligent agents, each agent being implemented in a local master, node responsible for a dynamically defined set of nodes in said circuit-switched communication network, wherein higher level agents arbitrate conflicts between peer agents, each agent being responsible for a dynamically defined set of nodes ($N_i$) comprising nodes linked in a such a way that at least a route with at least an amount B of concave resources exist between any pair of nodes in the set at the time t, and in that the level of each agent in said hierarchy, depends on the choice of the value B used for defining said set of nodes.

43. Device according to claim 26, wherein said circuit-switched communication network (1) is an ATM-network.

44. Device according to claim 26, wherein said circuit switched communication network (1) is a SDH network.

45. Device according to claim 26, wherein said circuit switched communication network (1) is a RSVP and TCP/IP network.

46. Device according to claim 26, wherein said circuit-switched communication network (1) is a TDM network.

47. Device according to claim 26, wherein a resource configured to determine nodes belonging to the same B-blocking island is a bandwidth.

48. A planning method for circuit-switched communication network (1), the method being performed on or with the aid of at least a programmable device (101) storing a representation of said network, comprising:
computing and storing in an electronic memory (1018, 1020) a representation of the network (1) based on B-blocking islands ($N_i$), each B-blocking island comprising a maximal set of nodes linked in a such a way that at least a route with at least an amount B of concave resources exist between any pair of nodes in the set, wherein
a B-blocking island is a grouping of subsets of nodes assigned to a distributed agent.

49. Planning method according to claim 48, further comprising:
organizing said B-blocking islands in a hierarchy wherein the hierarchical position of each B-blocking island depends on the choice of the value B used for defining said B-blocking island.

50. Planning method according to claim 48, further comprising:
the step of graphically displaying on a display (1014) connected to said programmable device (101) a summarized representation of said network.

51. Planning method according to claim 50, further comprising:
graphically highlighting on said display (1014) critical links between said blocking islands.

52. Network planning tool (101) configured to analyze a behavior of an existing circuit-switched communication network (1) and/or for planning modification of an existing network, said network planning tool comprising:
processing means (1016);
storing means (1018, 1020);
display means (1014);
program code means for causing said processing means (1016) to compute, from a representation of the topology of the network and from a set of demands, a summarized representation of the state of said network at a time t, wherein
said summarized representation summarizes available resources by grouping at least some nodes of said network into a plurality of B-blocking islands ($N_i$), each B-blocking island comprising a set of nodes linked in a such a way that at least one route with at least an amount B of resources exists between any pair of nodes in the set at the time t; and
program code means (1011) for causing said processing means (1016) to store in said storing means (1018, 1020) and to display on said display means (1014) said summarized representation, wherein a B-blocking island is a grouping of subsets of nodes assigned to a distributed agent.

53. A device (10) configured as a terminal node or as a communication node in a circuit-switched communication network (1), comprising:
means for computing, means for storing, and means for updating at least a part of a B-blocking island hierarchy, said B-blocking island comprising a maximal set of concave nodes linked in a such a way that at least one route with at least an amount B of resources exists between any pair of nodes, in the set at the time t, and the position of each B-blocking island in said B-blocking island hierarchy being dependent on the choice of the value $B_i$ used for defining said blocking island, wherein a B-blocking island is a grouping of subsets of nodes assigned to a distributed agent.

54. A program storage device (1011) readable by a programmable apparatus (101) and configured in such a way that it causes said programmable apparatus (101) to perform the method according to claim 1.

55. A program storage device (1011) according to claim 54, wherein said programmable apparatus (101) comprises:
means (1016, 1018, 1020) for computing a representation of the network based on B-blocking islands ($N_i$), each B-blocking island comprising a maximal set of concave nodes linked in a such a way that at least one route with at least an amount B of resources exists between any pair of nodes in the set at the time t; and
means (1018, 1020) for storing said representation, wherein a B-blocking island is a grouping of subsets of nodes assigned to a distributed agent.

56. Circuit-switched communication network (1) comprising at least one device (10) according to claim 26.

57. A program storage device (1011) readable by a computer and configured in such a way that it causes said computer to perform the method according to claim 48.

58. A processor readable medium (1011) which is configured in such a way that it causes a programmable device (10) to compute, store and update at least a part of a blocking island hierarchy, said B-blocking island comprising a maximal set of concave nodes linked in a such a way that at least one route with at least an amount B of resources exists between any pair of nodes in the set at the time t, and the position of each B-blocking island in said B-blocking island hierarchy being dependent on the choice of the value B, used for defining said blocking island, wherein a B-blocking island is a grouping of subsets of nodes assigned to a distributed agent.

* * * * *